March 16, 1937.  C. E. ELLISON  2,073,737
TEAT CUP FOR MILKING MACHINES
Filed Nov. 29, 1935   2 Sheets-Sheet 2
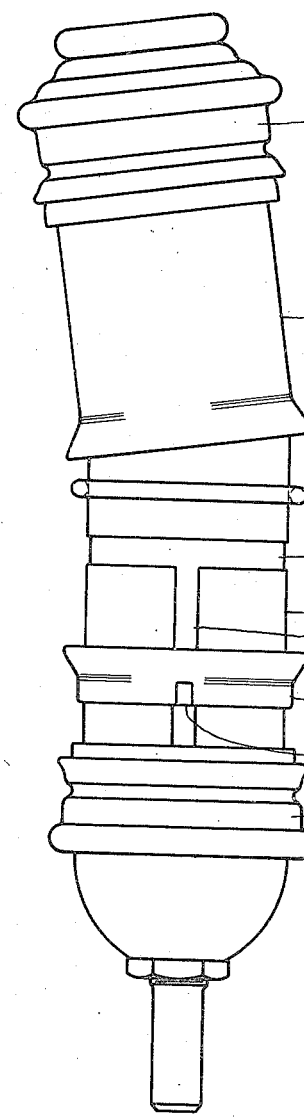
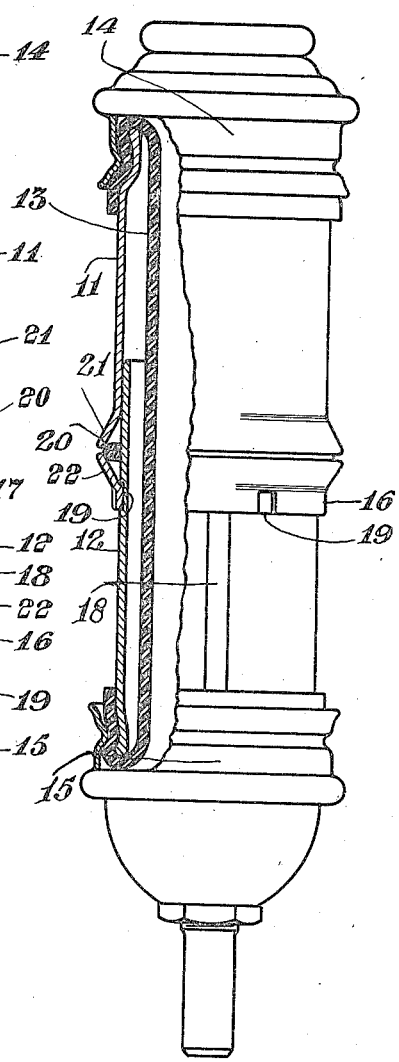
Inventor:
Carl Elis Ellison
by George Bayard Jones
Attorney.

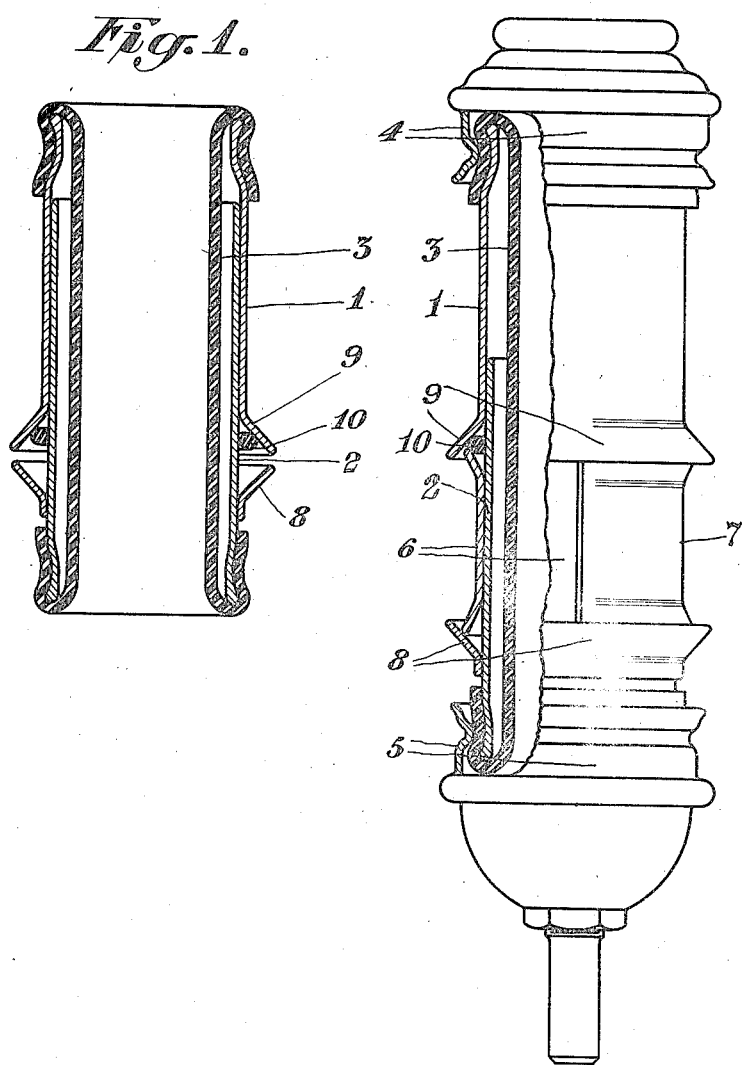

Patented Mar. 16, 1937

2,073,737

UNITED STATES PATENT OFFICE 2,073,737

TEAT-CUP FOR MILKING MACHINES

Carl Elis Ellison, Norrkoping, Sweden

Application November 29, 1935, Serial No. 52,034
In Sweden December 3, 1934

8 Claims. (Cl. 31—84)

In teat cups for milking machines elastic inner sleeves or linings are used which must always be maintained in a properly stretched condition in order that an efficient operation shall be secured.

In hitherto used teat cups this stretching of the elastic inner sleeve is in many cases difficult for the operator to perform, whether the stretching is to be made by hand or by the use of more or less complicated tools, with the result that a satisfactory stretching is not obtained.

Heretofore proposed constructions of adjustable teat cups were unsatisfactory, in some cases in view of the fact that the parts of the teat cup were too complicated and expensive to be used in practice, and in other cases because the stretching of the liner sleeve had to be effected by means of screw joints or the like in the teat cup, this lastmentioned construction being unfit for practical use both in view of the fact that it is not possible to make a screw joint perfectly airtight, and also because when adjusting the screw joint the liner sleeve is carried along so that it will occupy a twisted position in the teat cup.

The present invention has for its purpose to completely eliminate these disadvantages and also to provide the advantage that the liner sleeve can always be easily stretched to the correct extent.

The teat cup according to the present invention is provided with a teat cup tube or casing consisting of two parts telescopically slidable one in the other, so that when the elastic liner sleeve of the teat cup has been fastened to the ends of the teat cup tube, tension may be set up in said liner sleeve by moving said two parts of the teat cup tube away from each other.

The present invention is principally characterized by the teat cup tube being provided, for the purpose of retaining the two parts of the tube in their extended or elongated position, with a stop device, such as a band, a tube, or the like, which is adapted to be attached, after the liner sleeve has been mounted in position on the teat cup tube and the two parts of the latter have been moved away from each other, and to be secured in a fixed position on the inner part in such manner that it forms a continuation of the outer part of the tube against which the end of said outer part surrounding the inner part bears.

The said stop device, in the preferred form, may consist of a ring which is slidable on the end of the inner part remote from the outer part, and which is adapted to be secured to said inner part by means of a bayonet lock device.

In the accompanying drawings two constructional forms of teat cups embodying the present invention are illustrated by way of example.

Fig. 1 shows a section through the two parts of the teat cup tube or casing, according to the first constructional form, in closed or collapsed position and with the liner sleeve turned over the ends of the tube, which ends are of reduced diameter, so that an annular clearance is provided between said liner sleeve and the smooth inner wall of the inner of said two parts, and Fig. 2 shows a side view, partially in section, of the complete teat cup with the parts of the tube in extended position and the liner sleeve stretched.

Fig. 3 shows the teat cup according to the second constructional form in side view and partially in section with the two parts of the tube and the stop device in working position, and Fig. 4 shows a side view of the teat cup with the tube parts pulled completely away from each other, the outer tube part or sleeve resting against the end of the inner tube part.

The teat cup tube consists of two parts, an outer sleeve 1 and an inner sleeve 2, the latter being telescopically slidable in the former. When mounting the liner sleeve 3, the teat cup tube is pushed together to its smallest length, as shown in Fig. 1, and the liner sleeve can then be folded without difficulty over both ends of the tube to exact position, without having been put under the required tension, however. The liner sleeve is now locked in position by pushing the top ring 4 and the bottom ring 5 over the ends thereof, after which the liner sleeve is stretched by pulling the sleeves 1 and 2 away from each other. It will be seen that there is a clearance between said liner sleeve and the adjacent inner walls of the telescoping sleeves. The sleeves are then retained in such position by means of a stop device which in this constructional form consists of a tube which fits around the inner sleeve 2 and which is divided in the longitudinal direction into two or more sections, as 6 and 7, forming a displaceable device.

When said tube sections 6 and 7 are placed around the sleeve 2, their lower ends bear against an abutment or flange 8 on the inner sleeve 2, said flange being preferably conical for the purpose of forcing said sections 6 and 7 inwards against the sleeve 2. Bearing against the upper ends of the said tube sections 6 and 7 is the lower edge of the outer sleeve 1 which is also preferably provided with a similar conical flange 9. For providing the air-tight joint necessary between the two parts 1 and 2 of the teat cup tube, suitable sealing means is employed, which is preferably in the form of a separate packing ring 10 of elastic material and circular cross section, placed between the said flange 9 and the stop device, i. e., in this case the upper ends of the tube sections 6 and 7. Owing to the tension of the inner sleeve tending to pull the parts or sleeves 1 and 2 together, the tube sections 6 and 7 will be retained between the flanges 8 and 9, and the packing ring 10 will be forced into the angle between the flange 9 and the inner sleeve 2.

The displaceable stop device consisting of the tube sections 6 and 7 may, of course, be made of several different heights whereby any one of a number of different sizes is available, so that the liner sleeve may be given the desired tension to suit circumstances.

In the constructional form illustrated in Figs. 3 and 4, the teat cup tube also consists of two parts, an outer sleeve 11 and an inner sleeve 12, the latter telescoping into the former.

Also in this case the teat cup tube is pushed together to its smallest length when the liner sleeve 13 is applied thereto, and when the liner sleeve has been turned over the two ends of the tube and has been clamped thereto by applying the top ring 14 and bottom ring 15, the liner sleeve is stretched by pulling the sleeves 1 and 2 away from each other, preferably so far that the outer sleeve 11 may be moved somewhat to one side whereby it will rest against the end of the inner sleeve, as shown in Fig. 4.

The stop device for the outer sleeve may now easily be placed in position. The stop device consists of a ring 16 which is displaceable or slidable on the portion of the inner sleeve 12 remote from the outer sleeve 11. The inner sleeve 12 is provided with an external circumferential groove 17 and with a longitudinal groove or several such grooves 18 which extend from the circumferential groove towards the end of the inner sleeve remote from the outer sleeve. The ring 16 is provided with a corresponding number of inside projections or offsets 19 projecting into said grooves. When the ring is moved upwards from the position shown in Fig. 4, said offsets 19 will thus travel in the longitudinal grooves 18, until the offsets 19 reach the circumferential groove 17, after which the ring 16 may be rotated in either direction so that the offsets 19 enter the groove 17, after which the ring is locked against axial displacement, as illustrated in Fig. 3.

A packing ring 20, preferably of the circular section shown, placed around the inner sleeve 12 is then moved down against the stop ring 16, after which the outer sleeve 11 is returned to a position in axial alignment with the inner sleeve. The stretched liner sleeve 13 will then pull the outer sleeve 11 downwards so that the lower edge thereof will contact with the packing ring 20 and force the same against the stop ring 16. The opposing edges of the outer sleeve 11 and of the stop ring 16 are preferably shaped as conical flanges 21 and 22, respectively, so that the packing ring 20 will be forced into the angles between said flanges and the inner sleeve 12, as illustrated in Fig. 3, whereby perfect tightness is assured.

The stop devices here described and illustrated are thus simple and easy to manipulate and ensure good and efficient tightness, and the parts thereof are also easily accessible for cleaning and inspection.

It will be understood that the invention is not limited to the constructional forms above described and illustrated in the drawings. For instance, the stop device may consist of a screw band, a hose clamp, or the like, placed around the inner sleeve or part of the tube.

I claim:

1. A teat cup for milking machines, comprising in combination an outer casing consisting of an outer sleeve and an inner sleeve the latter telescoping into the former, an inner elastic lining secured at its opposite ends to said outer casing, and a stop device adapted to be secured in a fixed position to said inner sleeve after moving said two sleeves away from each other to stretch said elastic lining, so as to form an abutment on said inner sleeve against which the end of said outer sleeve bears.

2. A teat cup for milking machines, comprising in combination an outer casing consisting of an outer sleeve and an inner sleeve the latter telescoping into the former, an inner elastic lining secured at its opposite ends to said outer casing, a flange on said inner sleeve, and a stop device adapted to be secured in a fixed position to said inner sleeve after moving said two sleeves away from each other to stretch said elastic lining, so as to form an abutment on said inner sleeve against which the end of said outer sleeve bears, said stop device consisting of a tube divided longitudinally into a number of sections adapted to be placed around said inner sleeve between said flange on the same and the end of the outer sleeve, after moving said sleeves away from each other.

3. A teat cup for milking machines, comprising in combination an outer casing consisting of an outer sleeve and an inner sleeve the latter telescoping into the former, an inner elastic lining secured at its opposite ends to said outer casing, a flange on said inner sleeve, a stop device adapted to be secured in a fixed position to said inner sleeve after moving said two sleeves away from each other to stretch said elastic lining, so as to form an abutment on said inner sleeve against which the end of said outer sleeve bears, said stop device consisting of a tube divided longitudinally into a number of sections adapted to be placed around said inner sleeve between said flange on the same and the end of the outer sleeve, after moving said sleeves away from each other, and a packing ring surrounding said inner sleeve between the end of said outer sleeve and said stop device.

4. A teat cup for milking machines, comprising in combination an outer casing consisting of an outer sleeve and an inner sleeve the latter telescoping into the former, an inner elastic lining secured at its opposite ends to said outer casing, and a stop device adapted to be secured in a fixed position to said inner sleeve after moving said two sleeves away from each other to stretch said elastic lining, so as to form an abutment on said inner sleeve against which the end of said outer sleeve bears, said stop device consisting of a ring slidable on said inner sleeve, and a bayonet lock device for securing said ring to said sleeve.

5. A teat cup for milking machines, comprising in combination an outer casing consisting of an outer sleeve and an inner sleeve the latter telescoping into the former, an inner elastic lining secured at its opposite ends to said outer casing, said inner sleeve having an external circumferential groove and at least one longitudinal groove extending from said circumferential groove, and a ring slidable on said inner sleeve and provided with at least one internal offset engaging said grooves, said ring being adapted to be locked against longitudinal sliding movement on said inner sleeve by said internal offset on said ring being moved into said circumferential groove in said inner sleeve after moving said sleeves away from each other to stretch said elastic lining.

6. A teat cup for milking machines, comprising in combination an outer casing consisting of an outer sleeve and an inner sleeve the latter telescoping into the former, an inner elastic lining secured at its opposite ends to said outer casing, said inner sleeve having an external circumferential groove and at least one longitudinal groove extending from said circumferential groove, a ring slidable on said inner sleeve and provided with at least one internal offset engaging said grooves, said ring being adapted to be locked against longitudinal sliding movement on said inner sleeve by said internal offset on said ring being moved into said circumferential groove in said inner sleeve after moving said sleeves away from each other to stretch said elastic lining, and a packing ring surrounding said inner sleeve between said outer sleeve and said ring.

7. A teat cup for milking machines, comprising in combination an outer casing consisting of an outer sleeve and an inner sleeve the latter telescoping into the former, an inner elastic lining secured at its opposite ends to said outer casing, an elastic packing ring surrounding said inner sleeve, and a displaceable stop device adapted to be secured in fixed position to said inner sleeve after moving said two sleeves away from each other to stretch said elastic lining, said stop device forming an abutment on said inner sleeve between which and the end of said outer sleeve said elastic packing ring is compressed to seal the joint between said sleeves.

8. A teat cup for milking machines, comprising in combination an outer casing consisting of an outer sleeve and an inner sleeve, the latter telescoping into the former, an inner elastic lining secured at its opposite ends to said outer casing, an elastic packing ring surrounding said inner sleeve, and a displaceable stop device adapted to be secured in fixed position to said inner sleeve after moving said two sleeves away from each other to stretch said elastic lining, said stop device forming an abutment on said inner sleeve between which and the end of said outer sleeve said packing ring is compressed to provide an air-tight seal, said stop device consisting of a ring slidable on said inner sleeve, and a bayonet lock device for securing said ring to said sleeve.

CARL ELIS ELLISON.